United States Patent
Koyuncu et al.

(10) Patent No.: US 11,188,685 B2
(45) Date of Patent: Nov. 30, 2021

(54) SECURE TRANSIENT BUFFER MANAGEMENT

(71) Applicant: Google LLC, Mountain View, CA (US)

(72) Inventors: Osman Koyuncu, San Diego, CA (US); William Alexander Drewry, Nashville, TN (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 16/283,539

(22) Filed: Feb. 22, 2019

(65) Prior Publication Data
US 2020/0272770 A1    Aug. 27, 2020

(51) Int. Cl.
| | |
|---|---|
| *G06F 21/71* | (2013.01) |
| *G06F 21/72* | (2013.01) |
| *G06F 21/85* | (2013.01) |
| *G06F 12/14* | (2006.01) |
| *G06F 21/60* | (2013.01) |
| *G06F 21/73* | (2013.01) |
| *H04L 9/14* | (2006.01) |
| *G06F 21/78* | (2013.01) |

(52) U.S. Cl.
CPC .......... *G06F 21/85* (2013.01); *G06F 12/1408* (2013.01); *G06F 12/1441* (2013.01); *G06F 21/602* (2013.01); *G06F 21/72* (2013.01); *G06F 21/73* (2013.01); *H04L 9/14* (2013.01); *G06F 2212/1052* (2013.01); *G06F 2212/402* (2013.01)

(58) Field of Classification Search
None
See application file for complete search history.

(56) References Cited

U.S. PATENT DOCUMENTS

| | | | |
|---|---|---|---|
| 9,911,008 | B2 | 3/2018 | Henry et al. |
| 10,248,333 | B1 | 4/2019 | Shah et al. |
| 2003/0041248 | A1* | 2/2003 | Weber ............ G06F 21/85 |
| | | | 713/182 |
| 2003/0188178 | A1 | 10/2003 | Strongin et al. |

(Continued)

FOREIGN PATENT DOCUMENTS

| | | |
|---|---|---|
| WO | 2019118203 | 6/2019 |
| WO | 2020171844 | 8/2020 |

OTHER PUBLICATIONS

Cross-VM cache-based side channel attacks and proposed prevention mechanisms: A survey. Anwar. Elsevier. (Year: 2017).*

(Continued)

*Primary Examiner* — Venkat Perungavoor
(74) *Attorney, Agent, or Firm* — Colby Nipper PLLC

(57) ABSTRACT

A system is described that secures application data being maintained in transient data buffers that are located in a memory that is freely accessible to other components of the system, regardless as to whether those components have permission to access the application data. The system includes an application processor, a memory having a portion configured as a transient data buffer, a hardware unit, and a secure processor. The hardware unit accesses the transient data buffer during execution of an application at the application processor. The secure processor is configured to manage encryption of the transient data buffer as part of giving the hardware unit access to the transient data buffer.

20 Claims, 5 Drawing Sheets

(56) References Cited

U.S. PATENT DOCUMENTS

| | | | | |
|---|---|---|---|---|
| 2007/0226412 | A1* | 9/2007 | Morino | G06F 21/10 |
| | | | | 711/113 |
| 2009/0259753 | A1* | 10/2009 | Hinton | H04L 67/30 |
| | | | | 709/226 |
| 2010/0174845 | A1 | 7/2010 | Gorobets et al. | |
| 2011/0131470 | A1* | 6/2011 | Kambayashi | H04L 9/0838 |
| | | | | 714/763 |
| 2012/0147937 | A1* | 6/2012 | Goss | G06F 12/145 |
| | | | | 375/222 |
| 2012/0159239 | A1* | 6/2012 | Chon | G06F 1/30 |
| | | | | 714/6.11 |
| 2014/0181520 | A1* | 6/2014 | Wendling | G06Q 20/3572 |
| | | | | 713/169 |
| 2015/0161060 | A1* | 6/2015 | Suzuki | G06F 12/1408 |
| | | | | 713/193 |
| 2016/0232105 | A1* | 8/2016 | Goss | H04L 9/3236 |
| 2018/0011802 | A1 | 1/2018 | Ndu et al. | |
| 2018/0217944 | A1* | 8/2018 | Eperiesi-Beck | H04L 63/0876 |
| 2019/0042477 | A1 | 2/2019 | Chhabra et al. | |
| 2019/0327242 | A1* | 10/2019 | Anderson | H04L 63/102 |

OTHER PUBLICATIONS

Cipher Instruction Search Attack on the Bus-Encryption Security Microcontroller DS5002FP. Kuhn. IEEE. (Year: 1998).*
CN 1063837960. English Translation. (Year: 2017).*
Benchmarking of Hardware Trojans and Maliciously Affected Circuits. Shakya. Springer. (Year: 2017).*
An Authenticated Encryption based Security Framework for NoC Architectures. IEEE. (Year: 2011).*
A survey of hardware Trojan threat and defense. Li. ElSevier (Year: 2016).*
"International Search Report and Written Opinion", PCT Application No. PCT/US2019/047569, dated Nov. 22, 2019, 12 pages.
Jung, et al., "A Group-Based Wear-Leveling Algorithm for Large-Capacity Flash Memory Storage Systems", Oct. 2007, 5 pages.
Phoenix, "High-Performance Low-Overhead Stochastic Wear Leveling of Flash Memory By Comparing Age of a Block with Age of a Randomly Selected Block", Jul. 20, 2020, 16 pages.
"International Preliminary Report on Patentability", Application No. PCT/US2019/047569, dated Aug. 10, 2021, 7 pages.

* cited by examiner

SECURE TRANSIENT BUFFER MANAGEMENT

BACKGROUND

Some systems rely on data buffers residing in memory to store transient application data being processed by different components of the system. For example, many mobile devices rely on system on chip (SoC) architectures that do not rely on central processing units (CPUs). Instead, these mobile devices may use hardware accelerator units for performing different functions alongside dedicated CPUs or microcontrollers (e.g., application processors). Each hardware accelerator unit may interface with a respective input output memory management unit (IOMMU) to interface with memory and manage information contained within transient data buffers located in the memory. The data contained within such transient data buffers may be sensitive (e.g., personal to a user of an application). With reliance on a shared memory, a hardware accelerator unit or application processor of the system that has access to the memory may further have access to the data contained within the data buffers regardless if that component should have access to the data.

SUMMARY

A system is described that secures application data being maintained in transient data buffers that are located in a memory that is freely accessible to other components of the system, regardless as to whether those components have permission to access the application data. The system includes an application processor, a memory having a portion configured as a transient data buffer, a hardware unit, and a secure processor. The hardware unit accesses the transient data buffer during execution of an application at the application processor. The secure processor is configured to manage encryption of data maintained in the transient data buffer to give the hardware unit access to the transient data buffer.

In one example, a system includes an application processor and a memory. The memory has a portion configured as a transient data buffer. The system further includes a hardware unit. The system further includes a secure processor configured to manage encryption of the transient data buffer to give the hardware unit access, during execution of an application at the application processor, to data associated with the application that is within the transient data buffer.

In a different example, a method is described for securing a transient data buffer located in a memory of a system. The method includes executing, by an application processor of the system, an application that relies on a hardware unit of the system to access data associated with the application that is within the transient data buffer, assigning, by a secure processor of the system, an encryption key to the transient data buffer, and managing, by the secure processor, encryption of the transient data buffer to give the hardware unit access to the data associated with the application that is within the transient data buffer.

In yet another example, a computer-readable storage medium includes instructions that, when executed, cause a secure processor of a system to secure transient data buffers located in a memory of the system by assigning an encryption key to a transient data buffer used by a hardware unit of the system, the transient data buffer stores data associated with an application, the storage of the data associated with the application occurs during execution of the application at an application processor of the system, and managing encryption of the transient data buffer gives the hardware unit access to the data associated with the application during the execution of the application.

In another example, a system for securing a transient data buffer located in a memory includes means for executing an application that relies on a hardware unit of the system to process data associated with the application that is stored in the transient data buffer during execution of the application. The system also includes means for assigning an encryption key to the transient data buffer and means for managing encryption of the transient data buffer to give the hardware unit access to the data associated with the application during the execution of the application.

DETAILED DESCRIPTION

The present disclosure describes techniques and apparatuses to enable a system, such as a system on chip (SoC) for a mobile device (e.g., a mobile phone), to secure application data being maintained in transient data buffers that are located in a memory that is freely accessible to hardware or processing components of the system. The techniques may do so regardless of whether those components have permission to access the application data. The techniques use a secure processor that is isolated from other processing units of the system (e.g., application processors) to independently manage encryption and decryption of application data being stored in the transient data buffers.

The secure processor may interface with encryption engines that are assigned to the hardware units of the system. The secure processor may manage a set of encryption keys and assign a unique encryption key to each transient data buffer contained in the memory. The secure processor validates whether a hardware unit has permission to access a transient data buffer (e.g., as being either a valid consumer or producer of the data contained within the transient data buffer) and depending on the outcome of the validation, directs or refrains from directing the encryption engines to encrypt data (e.g., when the data is written to the transient data buffer) or decrypt the data (e.g., when the data is read from the transient data buffer).

By controlling access to the encryption keys used to encrypt and decrypt the data, as opposed to controlling access to the transient data buffers themselves, the secure processor protects potentially sensitive application data by ensuring that data obtained via an unauthorized access to a transient data buffer at best results in compromised, encrypted, and seemingly meaningless data. Furthermore, the secure processor prevents unintended leaks of data within the transient data buffers, for example, if residual data in the transient data buffers is not cleared from the memory when the memory is released back to the system.

In this way, the techniques of this disclosure enable a system to secure the data contained within its transient data buffers without having to introduce complex system-level memory access controls to prevent unauthorized access of the physical memory that contains the transient data buffers. As such, even with reliance on a shared memory, the secure processor prevents hardware accelerator units, application processors, and other hardware and processing components of the system from gaining access to a usable form of application data contained within transient data buffers of the system.

Figure 1:
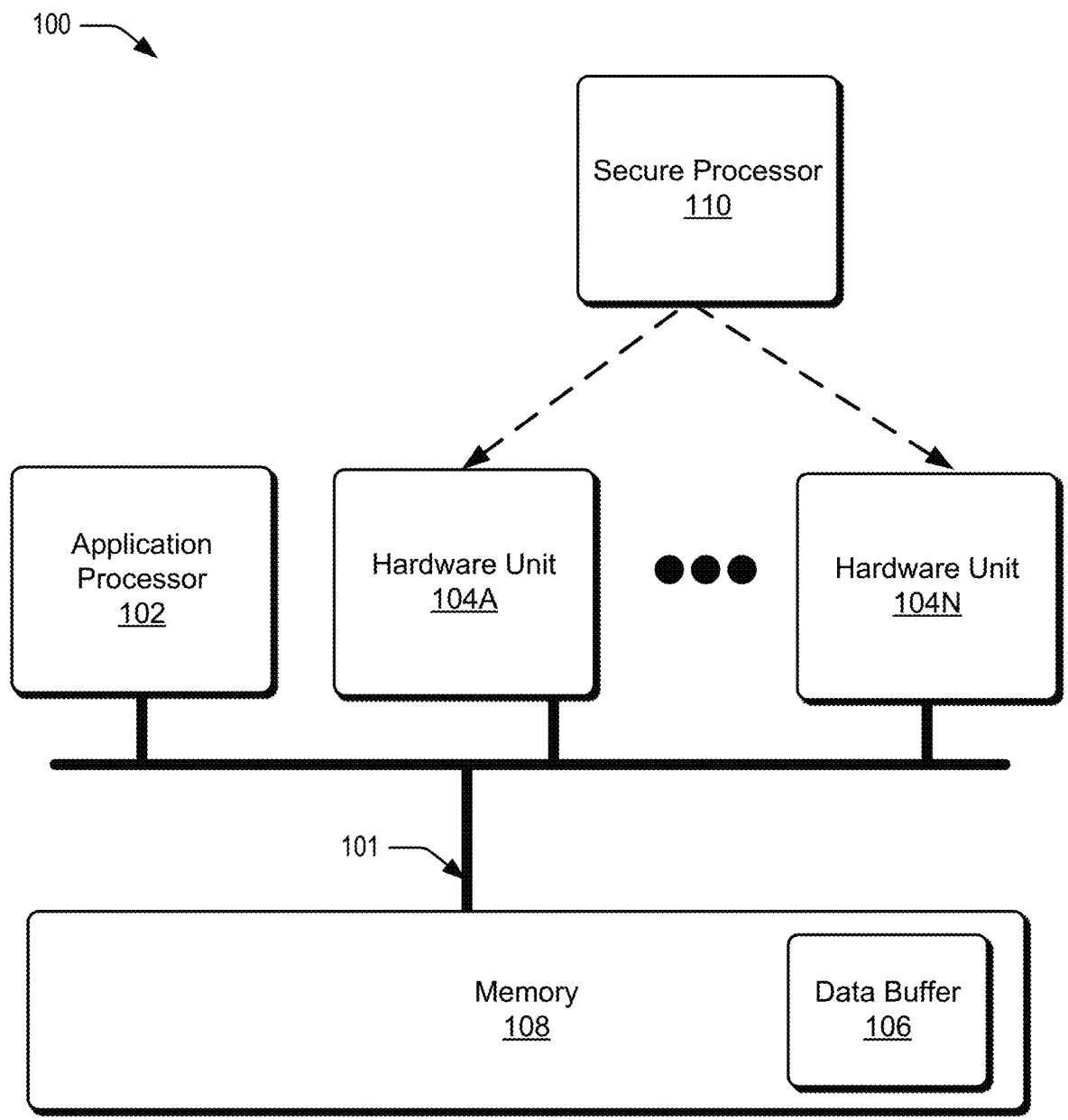
FIG. 1 is a conceptual diagram illustrating an example computing system configured to secure application data being maintained in transient data buffers.

FIG. 1 is a conceptual diagram illustrating an example computing system configured to secure application data being maintained in transient data buffers, in accordance with the techniques of this disclosure. The computing system 100 may form part of any type of mobile or non-mobile system. Some mobile examples of the computing system 100 include mobile phones, laptop computers, wearable devices (e.g., watches, eyeglasses, headphones, clothing), tablets, automotive/vehicular devices, portable gaming devices, electronic reader devices, and remote-control devices. Some non-mobile examples of computing system 100 include servers, network devices (e.g., routers, switches, firewalls), desktop computers, television devices, entertainment set-top devices, thermostat devices, garage door opener devices, other home devices or appliances, tabletop assistant devices, speaker devices, non-portable gaming devices, and business conferencing equipment.

The computing system 100 may be a system-on-chip (SoC). For example, the computing system 100 may be a component of a mobile phone that replaces a traditional central processing unit (CPU) or central controller processing architecture. Rather than cause the mobile phone to suffer from CPU performance bottlenecks, the distributive processing architecture of the computing system 100 may enable the mobile phone to offload work that would otherwise need to be performed by a CPU to one or more specialty hardware accelerator units, e.g., hardware units 104, that can perform the work more efficiently.

The computing system 100 of FIG. 1 includes an application processor 102. The application processor 102 is a main processing complex of the computing system 100. The application processor 102 is configured to execute software instructions (e.g., portions of applications and operating systems) associated with the computing system 100. For example, in cases where the computing system 100 is a SoC in a mobile phone, the application processor 102 may execute a mobile operating system, which provides an operating environment for mobile applications, e.g., executable applications pre-installed on the mobile phone or downloaded from an online application store. The application processor 102 may include any combination of one or more microcontrollers, application processors, digital-signal-processors, controllers, and the like, or a processor and memory system (e.g., implemented in a SoC), which process (e.g., execute) various computer-executable instructions to control operation of the computing system 100. In some examples, the computing system 100 can be implemented with any one or a combination of hardware, firmware, or fixed logic circuitry that is implemented in connection with processing and control circuits, which are generally identified as the application processor 102.

The computing system 100 further includes the group of hardware accelerator units 104 including a hardware unit 104A through a hardware unit 104N. Each of the hardware units 104 is a specialized unit or component configured to handle a particular set of one or more inputs and outputs of the computing system 100. Each of the hardware units 104 is configured to process data on behalf of the application processor 102.

For example, the hardware unit 104A may be a machine-learning hardware accelerator unit configured to execute a machine-learning model associated with the computing system 100. The hardware unit 104A may be specifically designed for executing machine-learning models. Rather than tie up processing resources of the application processor 102 executing the machine-learning model, the hardware unit 104A may execute the machine-learning model and provide an interface from which the application processor 102 and other components of the computing system 100 can interrogate the machine-learning model.

The other hardware units 104 may be specifically designed for executing other respective functions of the computing system 100. For example, the hardware unit 104N may be a specialized image processing hardware unit configured to preprocesses facial images for their subsequent use in performing facial recognition techniques (e.g., for authenticating user access to the computing system 100). Many other examples of the hardware units 104 exist including camera subsystems, sensor input and output (I/O) subsystems, graphics or video accelerator units, communication or radio units, always-on sensor subsystems, always-on I/O subsystems, and the like.

The hardware units 104 and the application processor 102 exchange data over a link 101. The link 101 represents a wired or wireless communication bus. The hardware units 104 can receive input data from the application processor 102 and the other hardware units 104 via the link 101. The hardware units 104 can send output data to the application processor 102 and the other hardware units 104 via the link 101. For example, the application processor 102 may execute a mobile operating system and issue commands to the hardware unit 104N during an unlock operation of the mobile operating system. The commands direct the hardware unit 104N to process (e.g., format) a facial image captured during the unlock operation. The application processor 102 or the hardware unit 104N issue other commands to the hardware unit 104A during the unlock operation to cause the hardware unit 104A to determine whether to authenticate the unlock operation or invalidate the facial image processed by the hardware unit 104N and fail the unlock operation.

The application processor 102 and the hardware units 104 are communicatively coupled, via the link 101, to a memory 108. For example, the application processor 102 and the hardware units 104 may access the memory 108 via the link 101 by sending read and write requests to a controller of the memory 108. The link 101 may also be referred to as a "system bus 106" and can include any one or combination of different bus structures, such as a memory bus or memory controller, a peripheral bus, a universal serial bus, and/or a processor or local bus that utilizes any of a variety of bus architectures.

The memory 108 enables persistent and/or non-transitory data storage (i.e., in contrast to mere signal transmission), examples of which include random access memory (RAM), non-volatile memory (e.g., any one or more of a read-only memory (ROM), flash memory, EPROM, EEPROM), and a disk storage device. In some examples, the memory 108 represents dynamic random-access memory (DRAM) of the computing system 100. A disk storage device may be implemented as any type of magnetic or optical storage device, such as a hard disk drive, a recordable and/or rewriteable compact disc (CD), any type of a digital versatile disc (DVD), and the like. The memory 108 provides data storage mechanisms to store a data buffer 106, other types of information and/or data, and various software applications. For example, an operating system can be maintained as software instructions within the memory 108 and executed by the application processor 102.

The memory 108 may be part of, or separate from, the computing system 100. For example, as a SoC, rather than include a functional portion that is configured as a non-transitory memory, the computing system 100 may interface via the link 101 with the memory 108 on an external chip. The memory 108 is accessible to software entities executing at each of the application processor 102, the hardware units 104, and any other component of the computing system 100 or external entity that interfaces with the link 101.

In general, the memory 108 is configured to store operational data associated with applications executing at the application processor 102 and the hardware units 104. The memory 108 stores a data buffer 106. The data buffer 106 is a portion of the memory 108 that is configured as a transient data buffer. The data buffer 106 represents a transient data buffer controlled by one or more of the hardware units 104. For example, the hardware unit 104N may generate a stream of processed images and store the image stream at the transient data buffer 106 and the hardware unit 104A may access the transient data buffer 106 to validate the processed images in the stream.

The application processor 102 and each of the hardware units 104 may include respective memory management units (MMUs). The MMU of the application processor 102 may manage the mapping of the application processor 102 and the hardware units 104 into logical address space of the memory 108. The respective input output memory management unit (IOMMU) of each of the hardware units 104 may rely on the MMU of the application processor 102 to map a respective input and output buffer space into a respective portion of the memory 108.

The IOMMUs of the hardware units 104 may write data to, and read data from, the respective input and output buffer spaces, e.g., as a way to retain operational data during execution of an application, as a way to share information or communicate with other components of the computing system 100, and the like. For example, the hardware unit 104A may generate a stream of facial recognition scores and store the stream of scores at the transient data buffer 106. Part of an operating system executing at the application processor 102 may access the transient data buffer 106 to determine whether, based on the stream of scores, to authenticate or fail the unlock operation.

Data contained within the memory 108, including transient data within the transient data buffer 106, may be sensitive (e.g., personal to a user of an application). The user may not want the data to be shared outside of the computing system 100, or even outside of specific subsystems of the computing system 100. For example, a user may not want images of the user's face taken during a facial recognition unlock operation to be shared with other computing systems or devices beyond that shown in the computing system 100. In addition, the user may not want the images to be shared with any component of the computing system 100, other than the machine-learning unit 104A and hardware unit 104N. Unfortunately, with reliance on memory 108 (e.g., a shared memory) any hardware unit or processor of computing system 100 that has access to memory 108 may have access to information contained within data buffer 106, regardless if that component should have access to the data or not.

To secure the transient data buffer 106 stored within the memory 108, the computing system 100 includes a secure processor 110. The secure processor 110 manages encryption of application data generated during execution of applications that are at least partially executing at the application processor 102 and directing the hardware units 104 to access the transient data buffer 106. The secure processor 110 automatically encrypts data stored at the memory 108 and automatically decrypts the data when an authorized consumer of the data accesses the data from the memory 108.

The secure processor 110 is at least communicatively isolated from the application processor 102 and may be operationally isolated from the application processor 102 as well. Even if secure processor 110 and application processor 102 are not physically separated (e.g., by being connected to a common ground or power source), the secure processor 110 and the application processor 102 are logically separated so that the processors 102 and 110 cannot exchange data. Therefore, an application or portion thereof executing at the application processor 102 may not have privileges to access information or affect operations associated with the secure processor 110.

The secure processor 110 is communicatively coupled to each of the hardware units 104. In some examples, secure processor 110 is communicatively coupled to each of the hardware units 104 via a respective input output memory management unit (IOMMU). Each of the hardware units 104 may use an IOMMU configured to receive information (e.g., an encryption key) from the secure processor 110.

The secure processor 110 manages which of the hardware units 104 has access to which transient data buffers stored in the memory 108. The secure processor 110 may be configured to manage the encryption of the data buffer 106 by automatically directing the data within the data buffer 106 to be encrypted prior to the data being written to the memory 108. For example, the secure processor 110 may be configured to encrypt a data stream being output by an IOMMU of the hardware unit 104A as the data stream is transmitted, via the link 101, and written to the memory 108. The secure processor 110 may be configured to manage the encryption of the data buffer 106 by automatically directing the data within the data buffer 106 to be decrypted after the data is read from the memory 108. For example, the secure processor 110 may be configured to decrypt the data stream being input by an IOMMU of the hardware unit 104N as the data stream is received, via the link 101, and read from the memory 108.

The secure processor 110 may assign permissions to transient data buffers, such as data buffer 106, in one of many ways. In some examples, an application executing at the application processor 102 (e.g., an operating system, a consumer application) may specify any of the hardware units as being authorized to consume or produce data stored within a transient data buffer. In some examples, a producer of data stored within a transient data buffer at the memory 108 may define (e.g., at initialization, at run-time) which of the other hardware units 104, if any, is an authorized consumer or producer of data within the transient data buffer. In some examples, the secure processor 110 may be preprogrammed with rules specifying authorized consumers for transient data buffers when the data within the transient data buffers is generated by certain hardware units 104. The secure processor 110 may dynamically determine authorized consumers for transient data buffers when the data within the transient data buffers is generated by particular hardware units 104.

No matter what defines access, for each transient data buffer stored in the memory 108, the secure processor 110 may maintain a record of the authorized producers and consumers of the data within the transient data buffer. For example, in response to detecting a read or write access to a transient data buffer stored in the memory 108, the secure processor 110 may determine whether the accessor has the appropriate type of access. If the accessor has write access, the secure processor 110 may cause data output by the accessor during the read or write access to be encrypted and if the accessor has read access, the secure processor 110 may cause data input by the accessor during the read or write access to be decrypted.

The secure processor 110 may interface with encryption engines that are implemented or at least assigned to the hardware units 104. The secure processor 110 may manage a set of encryption keys and assign a unique encryption key to each transient data buffer contained in the memory 108. The secure processor 110 may validate whether a particular one of the hardware units 104 has permission to access a transient data buffer (e.g., as being either a valid consumer or producer of the data contained within the transient data buffer) and depending on the outcome of the validation, directs or refrains from directing the encryption engines to encrypt data (e.g., when the data is written to the transient data buffer) or decrypt the data (e.g., when the data is read from the transient data buffer). For example, the secure processor 110 may evaluate an accessor of a transient data buffer based on the permissions assigned to the transient data buffer. If the accessor has appropriate permissions (e.g., is either an authorized producer or consumer), the secure processor 110 may enable the accessor to generate encrypted data or receive decrypted data by automatically encrypting or decrypting the data upon write to or read from the memory 108.

By managing encryption of, as opposed to controlling access to, the transient data buffers contained in the memory 108, the secure processor 110 protects potentially sensitive application data contained in the memory 108. The potentially sensitive application data is protected by ensuring that any data obtained via an unauthorized access to a transient data buffer at best results in compromised, encrypted, and seemingly meaningless data. The secure processor 110 prevents unintended leaks of data within the transient data buffers, for example, if residual data in the transient data buffers is not cleared from the memory 108 when and if the portion of the memory 108 that is allocated to the transient buffer, is released back to the computing system 100.

Transient data buffers may become fragmented across memory, particularly when the transient data buffers are accessed by multiple different hardware units or processors. Traditional systems require each of the multiple hardware units or processors that access the transient data buffers to execute dedicated memory management logic at the direction of an operating system or supervisor thread (e.g., a hypervisor) executing at an application processor. As such, these traditional systems may be susceptible to attack from software entities that otherwise appear to manage memory but instead perform malicious operations as part of an attack. The techniques of this disclosure may enable a computing system to secure data contained within transient data buffers without having to introduce complex system-level memory access controls to prevent unauthorized access of the memory that contains the transient data buffers. The techniques involve adding encryption functionality to IOMMUs of hardware units of a computing system, so that, for dedicated data streams, transient data buffers are encrypted with a key at the source (e.g., at the producer) such that only legitimate or authorized consumers with access to the key may obtain unencrypted access to the data. As such, even with reliance on a shared memory, the secure processor secures transient data buffers by preventing unauthorized access to a usable form of their data.

Figure 2:
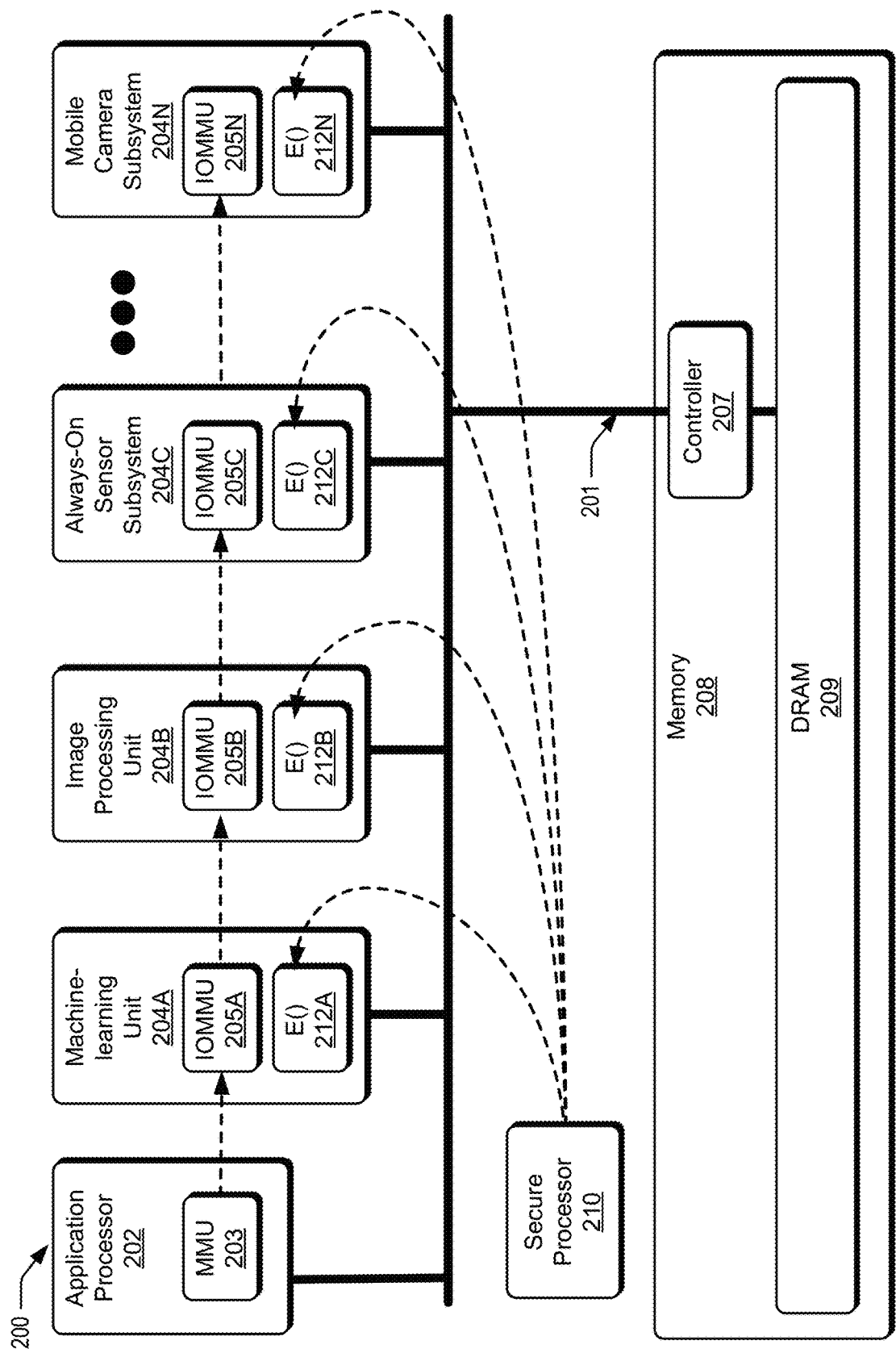
FIG. 2 is a conceptual diagram illustrating an additional example computing system configured to secure application data being maintained in transient data buffers.

FIG. 2 is a conceptual diagram illustrating an additional example computing system configured to secure application data being maintained in transient data buffers, in accordance with the techniques of this disclosure. Computing system 200 is an example of the computing system 100 of FIG. 1 and is described in the context of the computing system 100. The computing system 200 may be part of a SoC, e.g., for a mobile device, that is communicatively coupled to a memory 208.

The memory 208 is an example of the memory 108 of the computing system 100. The memory 208 includes a controller 207 and a dynamic random-access memory (DRAM) 209. The controller 207 is a processing unit configured to interface with the computing system 200 via a link 201. The controller 207 may process write commands and fulfill read commands received via the link 201. For example, the controller 207 may receive a write instruction via the link 101. The write instruction may specify data or a pointer to the data and a logical location of the DRAM 209 at which to write the data. The controller 207 may translate the logical location to a physical location of the DRAM 209 and cause a copy of the data to be written at the physical location. In reverse, the controller 207 may receive a read instruction via the link 101. The read instruction may specify a logical location of the DRAM 209 from which to read the data. The controller 207 may translate the logical location to a physical location of the DRAM 209 and cause the output of a copy of the data written at the physical location. The controller 207 may perform other operations, besides responding to read and write commands received via the link 201. For instance, the controller 207 may perform maintenance operations for maintaining integrity of the data stored in the DRAM 209.

The computing system 200 includes an application processor 202 and hardware units 204A through 204N (e.g., machine-learning hardware accelerator unit 204A, image processing hardware accelerator unit 204B, always-on sensor subsystem 204C, camera subsystem 204N, as well as any quantity of additional or fewer hardware units or subsystems, collectively "the hardware units 204") all communicatively coupled to the memory 208 via the link 201. Other types of the hardware units 204 may be used by other examples of the computing system 200, for example, in applications areas other than for mobile phones. For example, in an automotive setting, the hardware units 204 may include a radar or lidar hardware accelerator unit to perform navigation and obstacle avoidance.

The application processor 202 includes a memory management unit (MMU) 203. The MMU 203 is in command of IOMMUs 205A through 205N (collectively "the IOMMUs" 205) of the computing system 200. Each of the IOMMUs 205 is assigned to a respective different one of the hardware units 204. For example, the IOMMU 205A may receive a location of a respective input and output buffer space that has been mapped by the application processor 202, to a respective portion of the memory 208. The IOMMU 205A may write data to, and read data from, the respective input and output buffer spaces (e.g., to retain operational data during execution of an application, to share information or communicate with other components of the computing system 200).

The computing system 200 includes encryption engines 212A through 212N (collectively "the encryption engines 212"). In some examples, the encryption engines 212 are paired with multiple of the IOMMUs 205. In other examples, each of the encryption engines 212 corresponds to a different one of the IOMMUs 205. The encryption engines 212 may be similar or different types of encryption engines. For example, an encryption engine 212A may be a stream-cypher type engine that cryptographically encrypts data. The encryption engines 212 may perform advanced encryption standard (AES) in counter mode (CTR) encryption techniques. In other examples, the encryption engine 212A may be a mangling engine, such as an XOR function, that performs byte level encryption of data. The computing system 200 may use a different combination of the encryption engines 212 depending on a desired level of security and a desired level of performance.

Each of the encryption engines 212 is coupled to a different corresponding one of the IOMMUs 205 and is therefore further coupled to a different corresponding one of the hardware units 204. Each of the encryption engines 212 receives as input an encryption key from the secure processor 210.

The secure processor 210 is an example of the secure processor 110 of FIG. 1. The secure processor 210 is configured to selectively enable each of the encryption engines 212 to encrypt or decrypt data being maintained in transient data buffers at the memory 208. For example, the secure processor 210 may be isolated from the link 201. The secure processor 210 may communicate encryption keys needed by the encryption engines 212 to cryptographically scramble data written to the memory 208 and further needed by the encryption engines 212 to unscramble data read from the memory 208.

For each transient data buffer being managed by the secure processor 210, the secure processor 210 may maintain a set of permissions that indicate any authorized producer from the hardware units 204 and any authorized consumer from the hardware units 204. When an authorized producer or consumer from the hardware units 204 accesses a transient data buffer, the secure processor 210 may ensure that the data within the transient data buffer is encrypted or decrypted automatically.

The secure processor 210 can determine the set of permissions for a particular transient data buffer in various ways. The secure processor 210 may execute preprogrammed logic to assign a set of permissions. For example, the secure processor 210 is configured to always grant read permission to the image processing hardware accelerator unit 204B, for any transient data buffer created or modified by the camera subsystem 204N. As another example, the secure processor 210 is configured to always grant read permission to the machine-learning hardware accelerator unit 204A, for any transient data buffer created or modified by the camera subsystem 204N.

The secure processor 210 may execute preprogrammed logic to determine a set of permissions. For example, the secure processor 210 may determine parameters of a transient data buffer (e.g., size, name, offset, address, type, owner), and based on the parameters, infer which of the hardware units 204 is a valid consumer or producer of data with a transient data buffer. As one example, the secure processor 210 may determine that a transient data buffer created by the image processing hardware accelerator unit 204B with a first size or at a first location in memory 208 is shared with the machine-learning hardware accelerator unit 204A and a transient data buffer created by the image processing hardware accelerator unit 204B with a second size (e.g., different than the first size) or at a second location in memory 208 (e.g., different than the first location) is shared with the camera subsystem 204N.

The secure processor 210 may determine a set of permissions that apply to multiple of the hardware units 204. For example, the secure processor 210 may determine that a transient data buffer created by the always-on sensor subsystem 204C is typically shared with other one of the hardware units 204. The secure processor 210 may determine that a transient data buffer created by the always-on sensor subsystem 204C is typically shared with other of the hardware units 204.

Figure 3:
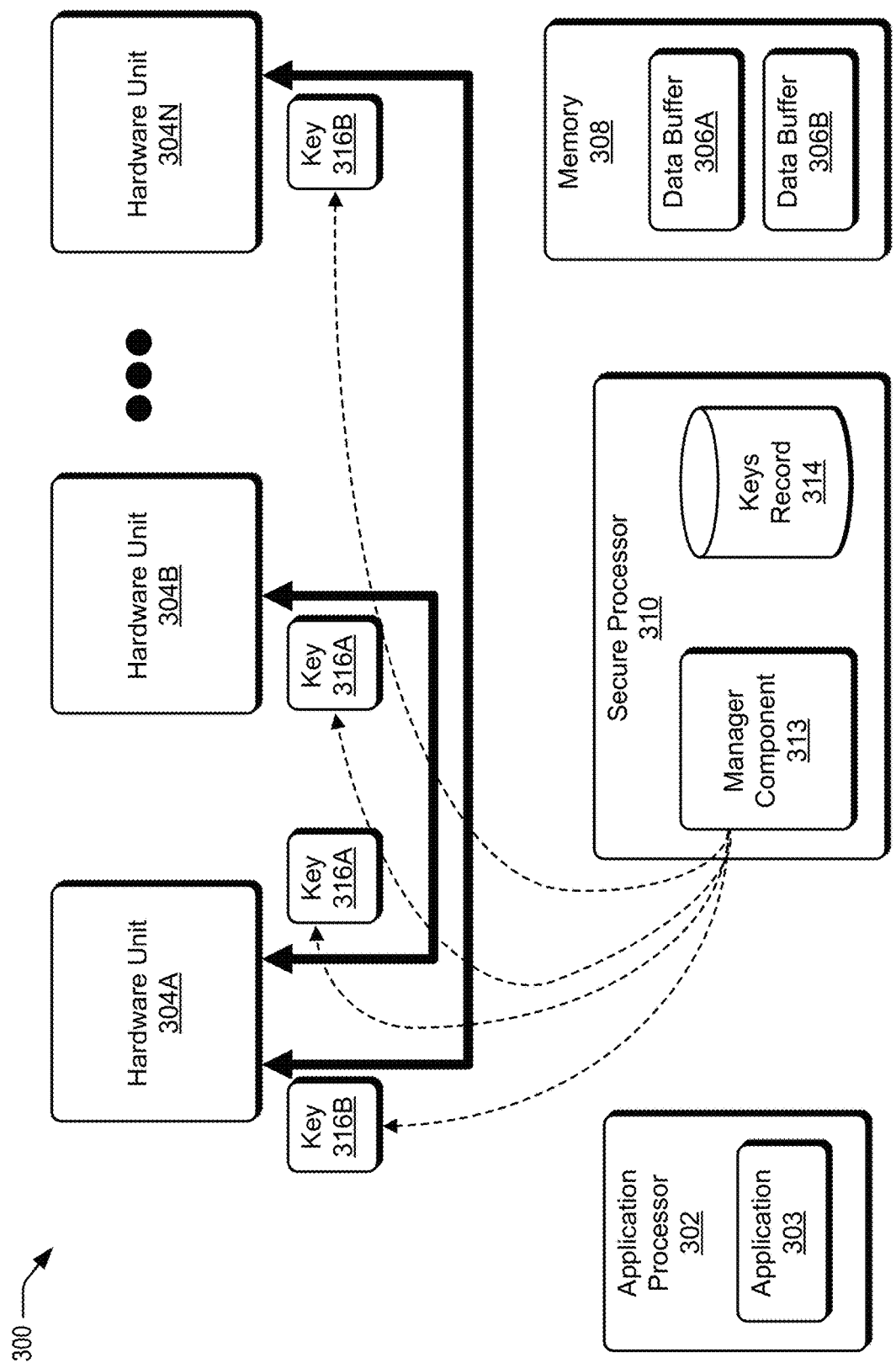
FIG. 3 is a conceptual diagram illustrating an example secure processor configured to secure application data being maintained in transient data buffers of an example computing system.

FIG. 3 is a conceptual diagram illustrating an example secure processor configured to secure application data being maintained in transient data buffers of an example computing system, in accordance with the techniques of this disclosure.

The computing system 300 of FIG. 3 includes a secure processor 310 communicating encryption keys 316A and 316B to hardware units 304A through 304N (collectively "the hardware units 304"). The computing system 300 also includes a memory 308 as well as an application processor 302. The secure processor 310 includes a manager component 313 and a keys record 314 and the application processor 302 includes an application 303. Transient data buffers 306A and 306B (collectively "the transient data buffers" 306) are located in the memory 308 and encrypted using an encryption key 316A or 316B.

The manager component 313 configures the secure processor 310 to manage encryption of data maintained in transient data buffers 306 by managing multiple encryption keys at the keys record 314. The manager component 313 may be implemented as hardware, software, firmware, or any combination thereof.

The manager component 313 updates the keys record 314 to indicate which of the hardware units 304 have access to which of the transient data buffers 306. For example, the keys record 314 may include an entry in a table for each of the transient data buffers 306A and 306B. Associated with each entry may be a respective encryption key 316A or 316B. Further associated with each entry may be a list of authorized consumers (e.g., one or more of the hardware units 304 authorized to read from the transient data buffers 106) and a list of authorized producers or sources (e.g., the one or more of the hardware units 304 authorized to write to the transient data buffers 106). In some examples, an authorized producer or source may also be an authorized consumer.

The manager component 313 may assign a unique key 316A or 316B from the keys record 314 to each of the transient data buffers 306A and 306B. For example, the manager component 313 may assign the key 316A from the keys record 314 to the data buffer 306A, and may further assign the unique key 316B from the keys record 314 to the data buffer 306B, in the memory 308. The manager component 313 may assign different, unique keys from the keys record 314 to each transient data buffer being secured by the secure processor 310.

The manager component 313 may assign a unique key 316A from the keys record 314 to each of the hardware units 304 that has access to the transient data buffer 306A. For example, the manager component 313 may assign the unique key 316A from the keys record 314 to the hardware units 304A and 304N so that the hardware unit 304A can read what the hardware unit 304N writes to the data buffer 306A, and vice versa. The manager component 313 may perform similar operations to assign the unique key 316B from the keys record 314 to each one of the hardware units 304 (e.g., the hardware unit 304A and the hardware unit 304B) that has access to the transient data buffer 306B.

In some examples, the secure processor 310 may cause a first encryption engine of one of the hardware units 304 to automatically encrypt or decrypt data using an encryption key that is also used by a second encryption engine of a different one of the hardware units 304 to automatically encrypt or decrypt the same data. In other words, the manager component 313 may assign unique encryption keys to multiples of the hardware units 304 so the multiples of the hardware units 304 can securely share data within transient data buffers that may be located in a memory that is otherwise accessible to other components of computing system 300. For example, the manager component 313 may assign the encryption key 316A to the transient data buffer 306A which is shared between the hardware units 304A and 304B and may assign the encryption key 316B to the transient data buffer 306B which is shared between the hardware units 304A and 304N.

The manager component 313 may preserve associations with the encryption keys 316A and 316B and the hardware units 304 at the keys record 314. For example, the keys record 314 may include one or more rules or logic that specify which of the hardware units 304 are authorized consumers of the transient data buffers 306A and 306B. The rules may specify different hardware units 304 as being authorized consumers depending on various conditions.

The manager component 313 may monitor requested read and writes from the IOMMUs of the hardware units 304. In cases where a requested read or write references transient data buffer 306A, which is shared between hardware units 304A and 304B, secure processor 310 may withhold encryption key 316A unless the access is initiated by one of hardware units 304A and 304B. In cases where a read or write attempts to access the transient data buffer shared between hardware units 304A and 304B, secure processor 310 may share encryption key 316A with the encryption engine of the one of hardware units 304A and 304B that initiated the access. Similar operations may be performed with regards to attempted writes or reads of the transient data buffer shared between hardware units 304A and 304N.

The manager component 313 may interface with MMUs and IOMMUs of the computing system 300 to segregate data in the transient data buffers 306A and 306B and secure the data within the transient data buffers 306A and 306B to prevent unauthorized access. By enabling the hardware units 304 to automatically encrypt and decrypt the data within the transient data buffers 306A and 306B, the manager component 313 secures the data within the transient data buffers 306A and 306B without preventing physical access to the transient data buffers 306A and 306B in the memory 308. Automatic encryption and decryption of the data within the transient data buffers 306A and 306B may segregate and protect the transient data buffers 306A and 306B by making them indistinguishable from other random data in the memory 308.

In some examples, the manager component 313 may rotate keys defined in the keys record 314. Rotating the keys in the keys record 314 may enable the manager component 313 to use a fresh key during each instantiation of a transient data buffer. Using fresh keys, as opposed to reusing old keys, enables the manager component 313 to prevent a malicious entity from replaying a data transfer within the transient data buffer during any future instantiations of the transient data buffer if an old key is compromised. As such, any residual data remaining in a decommissioned transient data buffer, cannot be inadvertently leaked as any data remaining is encrypted by an encryption key and, a transient data buffer location that is no longer preserved.

Figure 4:
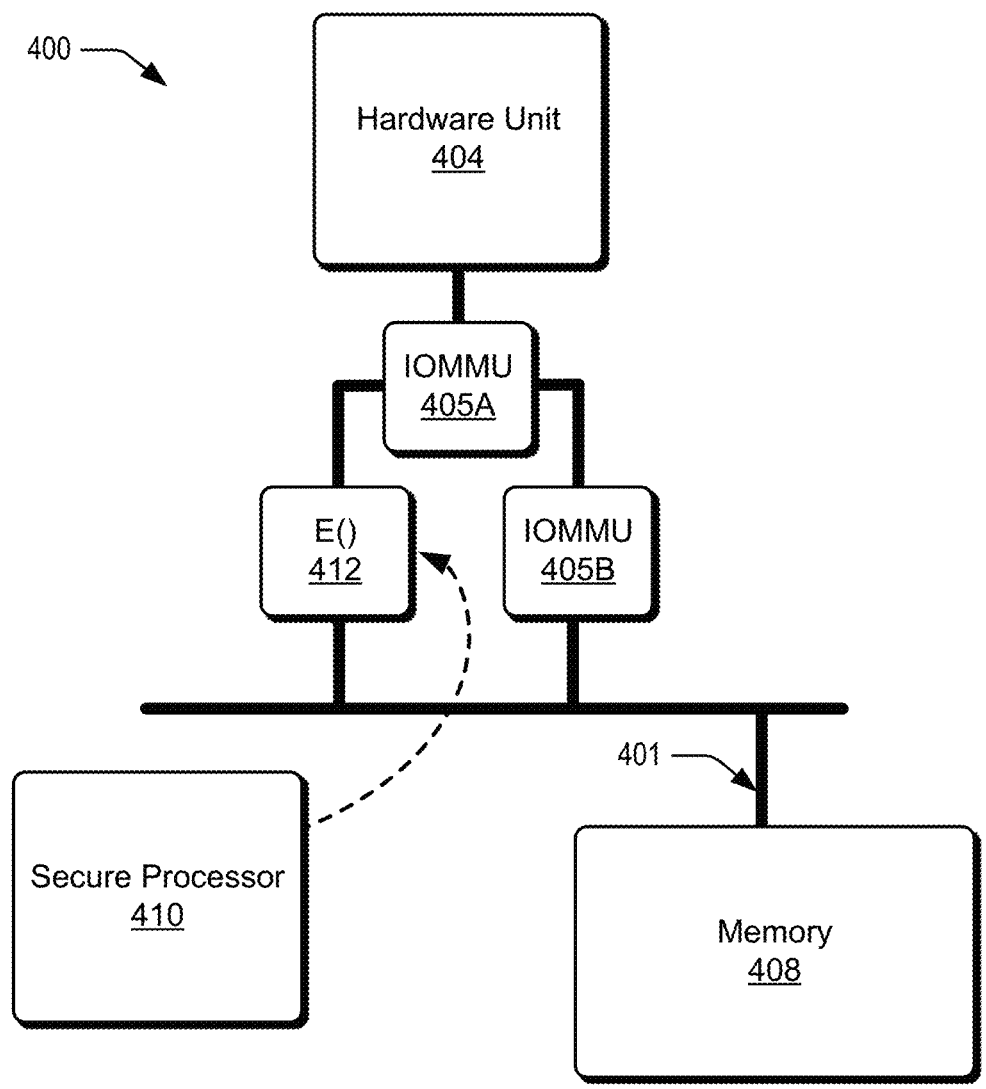
FIG. 4 is a conceptual diagram illustrating an example input and output memory management architecture of an example computing system configured to secure application data being maintained in transient data buffers.

FIG. 4 is a conceptual diagram illustrating an example input and output memory management architecture of an example computing system configured to secure application data being maintained in transient data buffers, in accordance with the techniques of this disclosure. Computing system 400 is described in the contexts of the computing system 100 of FIG. 1, the computing system 200 of FIG. 2, and the computing system 300 of FIG. 3.

The computing system 400 of FIG. 4 includes a secure processor 410 communicating with an encryption engine 412. The encryption engine 412 is assigned to a hardware unit 404. The hardware unit 404 includes or is associated with IOMMUs 405A and 405B (collectively "IOMMUs 405"). Hardware unit 404 is communicatively coupled to the memory 408 via a link 401.

The IOMMUs 405 and the encryption engine 412 represent an alternative IOMMU architecture that may be used in some instances, for example, to avoid latency issues that might otherwise arise from having to enable or disable encryption engine 412 during every access to a transient data buffer, regardless whether the data within the transient data buffer is sensitive or not. The IOMMU 405A represents a first-level IOMMU stage.

During the first-level IOMMU stage, a determination is made by the IOMMU 405A as to whether the data being accessed in the memory 408 is sensitive or not. In cases where the data is not sensitive, the IOMMU 405A engages the IOMMU 405B to implement the second-level IOMMU stage and access the data from the memory 408 without encrypting or decrypting the data. In cases where the data is sensitive, the IOMMU 405A engages the encryption engine 412 (e.g., which has already received an encryption key assigned to the transient data buffer) to decrypt or encrypt the data to fulfill the data access in the memory 408.

The IOMMU 405A may determine whether data is sensitive and therefore needs encryption, in one of several ways. The IOMMU 405A may be preprogrammed with rules that define when to encrypt or refrain from encrypting data. A producer or consumer of the data may indicate to the IOMMU 405A via a message or variable flag whether the producer or consumer expects the data to be encrypted.

Figure 5:
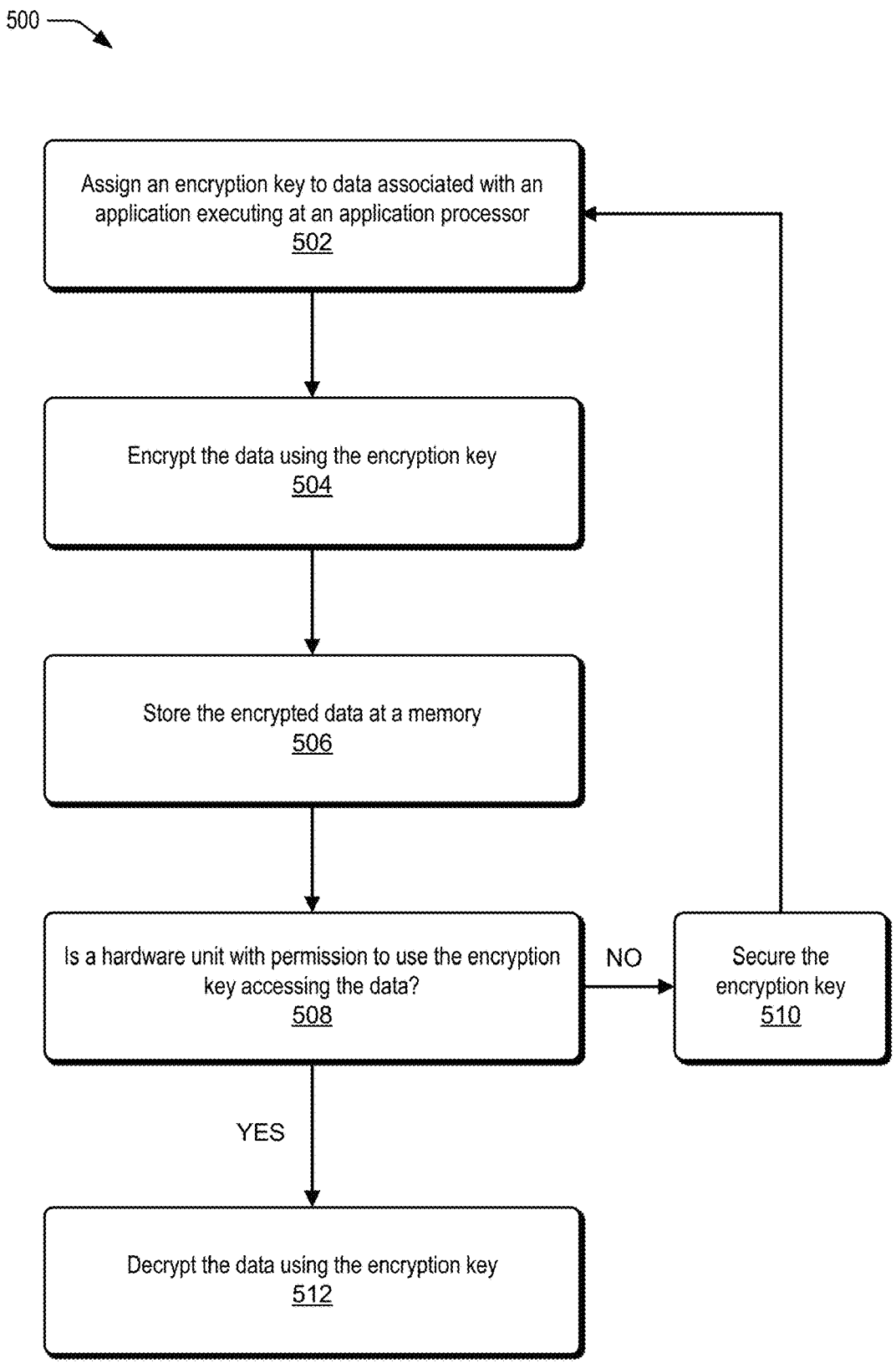
FIG. 5 is a flow-chart illustrating example operations for securing application data being maintained in transient data buffers of an example computing system.

FIG. 5 is a flow-chart illustrating example operations for securing application data being maintained in transient data buffers of an example computing system, in accordance with the techniques of this disclosure. The operations 500 include the steps 502 through 512. A secure processor, such as the secure processor 110, 210, 310, or 410 of FIGS. 1 through 4 may perform the operations 500. For ease of description, FIG. 5 is described in the context of the secure processor 310. The secure processor 310 may perform the operations 500 in any order with additional or fewer steps than what is shown in FIG. 5. The operations 500 may constitute a method for securing a transient data buffer located in a memory of a system, such as the transient data buffer 306A or the transient data buffer 306B located in the memory 308 of the computing system 300.

The application 303 may execute at the application processor 302. The application 303 may rely on one of the hardware units 304 to process data associated with the application 303 that is maintained at the transient data buffers 306A and 306B. The data in the transient data buffers 306A and 306B may be personal, user-sensitive data that a user of the computing system 300 may wish to remain private, at least from the application processor 302 and entities that execute there.

In operation, the secure processor 310 assigns an encryption key to data associated with an application partially executing at an application processor (502). For example, the application 303 may rely on the hardware unit 304A to perform a particular function using the data within the transient data buffer 306A. The hardware unit 304B may generate the data within the transient data buffer 306A and the hardware unit 304A may consume the data within the transient data buffer 306A. The manager component 313 of the secure processor 310 may maintain the keys record 314. Within the keys record 314, the manager component 313 may include an entry that assigns the encryption key 316A to the transient data buffer 306A. The manager component 313 may further indicate within the keys record 314 that, as is typical with the transient data buffer 306A, the hardware unit 304B is an authorized producer and the hardware unit 304A is an authorized consumer of the transient data buffer 306A.

The secure processor 310 manages encryption of the data associated with the application being maintained in the transient data buffer by encrypting the data using the encryption key (504) and storing the encrypted data at a memory (506). For example, whenever an IOMMU of the hardware unit 304B writes to the transient data buffer 306A, the manager component 313 may automatically cause the data to be encrypted using the encryption key 316A before the data is received by the memory 308 for storage at the transient data buffer 306A. In other words, the secure processor 310 may interrupt the data path between the memory 308 and the hardware units 304 so that any data headed for one of the transient data buffers 306 is encrypted automatically.

Once the data is written to a transient data buffer, the secure processor 310 determines whether a hardware unit with permission to use the encryption key assigned to the transient data buffer is accessing the data (508). For example, whenever an IOMMU of any one of the hardware units 304 attempts to read from the transient data buffer 306A, the manager component 313 may evaluate whether one of the hardware units 304 has consumer privileges associated with the transient data buffer 306A. The manager component 313 may query the keys record 314 for an identifier of a requested consumer or requested producer.

In response to determining that a hardware unit without permission to use the encryption key assigned to the transient data buffer is accessing the data (508, No branch), the secure processor 310 secures the encryption key (510) so at worst, the hardware unit can only obtain an encrypted form of the transient data. For example, whenever an IOMMU of any one of the hardware units 304 without access to the encryption key 316A attempts to read from the transient data buffer 306A, at worst the IOMMU merely receives an encrypted form of the data within the transient data buffer 306A.

In response to determining that a hardware unit with permission to use the encryption key assigned to the transient data buffer is accessing the data (508, Yes branch), the secure processor 310 automatically causes the data to be decrypted using the encryption key assigned to the transient data buffer when the data is read from the transient data buffer (512). For example, whenever an IOMMU of the hardware unit 304A reads from the transient data buffer 306A, the manager component 313 may automatically cause the data to be decrypted using the encryption key 316A before the data reaches the hardware unit 304A. In other words, the secure processor 310 may interrupt the data path between the memory 308 and the hardware units 304 so that any data originating from one of the transient data buffers 306 is decrypted, automatically.

As such, the secure processor 310 is configured to validate whether each one of the hardware units 304 is an authorized producer of the transient data buffer 306A prior to automatically directing the data associated with the application 303 that is within the transient data buffer 306A, to be encrypted with the encryption key 316A. Likewise, the secure processor 310 is configured to validate whether each one of the hardware units 304 is an authorized consumer of the transient data buffer 306A prior to automatically directing the data associated with the application 303 within the transient data buffer 306A, to be decrypted using the encryption key 316A. Manager component 313 may validate or vet, potential producers and consumers of data within the transient data buffers 306A and 306B automatically so that the data contained within the transient data buffers 306A and 306B can be secured, automatically, despite being freely accessible to other components of the computing system 300.

For example, responsive to validating the hardware unit 304N as an authorized producer of the transient data buffer 306B, the secure processor 310 may automatically cause data associated with the application 303 to be encrypted. The secure processor 310 encrypts the data associated with the application 303 using the encryption key 316B that is assigned to the transient data buffer 306B when the hardware unit 304N causes the data associated with the application 303 to be stored in the transient data buffer 306B. Likewise, responsive to validating the hardware unit 304A as an authorized consumer of the transient data buffer 306B, the secure processor 310 may automatically cause the data associated with the application 303 to be decrypted. The secure processor 310 decrypts the data associated with the application 303 using the encryption key 316B that is assigned to the transient data buffer 306B when the hardware unit 304A causes the data associated with the application 303 to be read from the transient data buffer 306B.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A system comprising:
an application processor;
a memory, the memory having a portion configured as a transient data buffer;
a hardware unit; and
a second processor, the second processor configured to manage at least one of encryption or decryption of the transient data buffer to give the hardware unit access, during execution of an application at the application processor, to data associated with the application that is within the transient data buffer by performing a validation of the hardware unit as being at least one of an authorized producer or an authorized consumer of the transient data buffer.

2. The system of claim 1, wherein the second processor is further configured to manage the at least one of the encryption or decryption of the transient data buffer by at least one of:
   automatically directing the data associated with the application to be encrypted prior to being written to the memory; or
   automatically directing the data associated with the application to be decrypted after being read from the memory.

3. The system of claim 2, further comprising at least one of:
   the second processor configured to validate the hardware unit as being an authorized producer of the transient data buffer prior to automatically directing the data associated with the application to be encrypted; or
   the second processor configured to validate the hardware unit as being an authorized consumer of the transient data buffer prior to automatically directing the data associated with the application to be decrypted.

4. The system of claim 1, wherein the hardware unit is a first hardware unit, the system further comprises a second hardware unit, and the second processor is configured to manage at least one of the encryption or decryption of the transient data buffer by at least one of:
   responsive to validating the first hardware unit as being an authorized producer of the transient data buffer, automatically directing, by the second processor, the data associated with the application to be encrypted using an encryption key assigned to the transient data buffer in response to the first hardware unit directing the data associated with the application to be stored in the transient data buffer; or
   responsive to validating the second hardware unit as being an authorized consumer of the transient data buffer, automatically directing, by the second processor, the data associated with the application to be decrypted using the encryption key assigned to the transient data buffer in response to the second hardware unit directing the data associated with the application to be read from the transient data buffer.

5. The system of claim 1, wherein:
   the system is a system on chip; and
   the memory is accessible to software entities executing at each of the application processor and the hardware unit.

6. The system of claim 1, wherein the second processor is configured to manage at least one of encryption or decryption of the transient data buffer by:
   managing multiple encryption keys; and
   assigning a unique key from the multiple encryption keys to the transient data buffer.

7. The system of claim 6, wherein:
   the transient data buffer is a first transient data buffer;
   the memory has a different portion configured as a second transient data buffer; and
   the second processor is configured to manage at least one of encryption or decryption of the second transient data buffer by assigning a different, unique key from the multiple encryption keys to the second transient data buffer.

8. The system of claim 1, further comprising:
   an encryption engine coupled to the hardware unit, wherein the second processor is further configured to enable the encryption engine to encrypt and decrypt the data associated with the application.

9. The system of claim 8,
   wherein the second processor is configured to communicate an encryption key to the encryption engine to enable the encryption engine to encrypt and decrypt the data associated with the application.

10. A method for securing a transient data buffer located in a memory of a system, the method comprising:
    executing, by an application processor of the system, an application that relies on a hardware unit of the system to access data associated with the application that is within the transient data buffer;
    assigning, by a second processor of the system, an encryption key to the transient data buffer; and
    managing, by the second processor, at least one of the encryption or decryption of the transient data buffer to give the hardware unit access to the data associated with the application that is within the transient data buffer by performing a validation of the hardware unit as being at least one of an authorized producer or an authorized consumer of the transient data buffer.

11. The method of claim 10, wherein managing at least one of the encryption or decryption of the transient data buffer further comprises at least one of:
    automatically directing, by the second processor, the data associated with the application to be encrypted using the encryption key assigned to the transient data buffer in response to the data associated with the application being stored in the transient data buffer; or
    automatically causing, by the second processor, the data associated with the application to be decrypted using the encryption key assigned to the transient data buffer in response to the data associated with the application being read from the transient data buffer.

12. The method of claim 11, further comprising at least one of:
    wherein the validation, by the second processor, of the hardware unit as being an authorized producer of the transient data buffer is performed prior to automatically directing the data associated with the application to be encrypted; or
    wherein the validation, by the second processor, of the hardware unit as being an authorized consumer of the transient data buffer is performed prior to automatically directing the data associated with the application to be decrypted.

13. The method of claim 10, wherein the hardware unit is a first hardware unit, the system further comprises a second hardware unit, and managing at least one of the encryption or decryption of the transient data buffer comprises at least one of:
    responsive to validating the first hardware unit as being an authorized producer of the transient data buffer, automatically directing, by the second processor, the data associated with the application to be encrypted using the encryption key assigned to the transient data buffer in response to the first hardware unit directing the data to be stored in the transient data buffer; or
    responsive to validating the second hardware unit as being an authorized consumer of the transient data buffer, automatically directing, by the second processor, the data to be decrypted using the encryption key assigned to the transient data buffer in response to the second hardware unit directing the data to be read from the transient data buffer.

14. The method of claim 10, wherein:
the system is a system on chip; and
the memory is accessible to software entities executing at the application processor and the hardware unit.

15. The method of claim 14, wherein the hardware unit of the system is a first hardware unit, the method further comprising at least one of:
automatically encrypting, by a first encryption engine of the first hardware unit, the data associated with the application using the encryption key;
automatically decrypting, by the first encryption engine of the first hardware unit, the data associated with the application using the encryption key;
automatically encrypting, by a second encryption engine of a second hardware unit of the system the data associated with the application using the encryption key; or
automatically decrypting, by the second encryption engine of the second hardware unit of the system, the data associated with the application using the encryption key.

16. The method of claim 10, wherein assigning an encryption key to the transient data buffer comprises at least one of:
assigning, by the second processor, a unique encryption key to the transient data buffer; or
assigning, by the second processor, unique encryption keys to other transient data buffers located in the memory of the system.

17. The method of claim 16, further comprising at least one of:
assigning, by the second processor, a unique encryption key to the hardware unit for accessing the transient data buffer; or
assigning, by the second processor, unique encryption keys to other hardware units of the system for accessing other transient data buffers located in the memory of the system.

18. A non-transitory computer-readable storage medium comprising instructions that, when executed, cause a second processor of a system to secure a transient data buffer located in a memory of the system by:
assigning an encryption key to a transient data buffer used by a hardware unit of the system, the transient data buffer stores data associated with an application, the storage of the data associated with the application occurs during execution of the application at an application processor of the system; and
managing at least one of the encryption or decryption of the transient data buffer to give the hardware unit access to the data associated with the application during the execution of the application by performing a validation of the hardware unit as being at least one of an authorized producer or an authorized consumer of the transient data buffer.

19. The non-transitory computer-readable storage medium of claim 18, wherein the instructions, when executed, cause the second processor to manage at least one of the encryption or decryption of the data stored in the transient data buffer by at least one of:
automatically directing the data to be encrypted using the encryption key assigned to the transient data buffer in response to the data associated with the application being stored in the transient data buffer; or
automatically directing the data to be decrypted using the encryption key assigned to the transient data buffer in response to the data associated with the application being read from the transient data buffer.

20. The non-transitory computer-readable storage medium of claim 19, wherein the instructions, when executed, further cause the second processor to:
perform the validation of the hardware unit as being an authorized producer of the transient data buffer prior to automatically directing the data associated with the application to be encrypted; or
perform the validation of the hardware unit as being an authorized consumer of the transient data buffer prior to automatically directing the data associated with the application to be decrypted.

* * * * *